Nov. 15, 1938.   S. CLEMENTS   2,136,414
SHEARS
Filed May 5, 1934
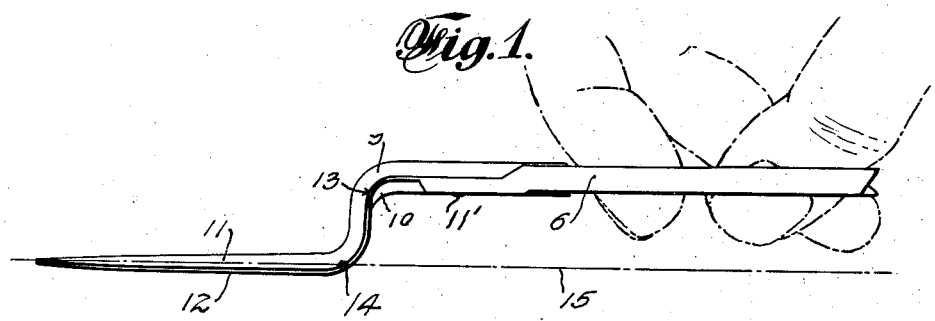
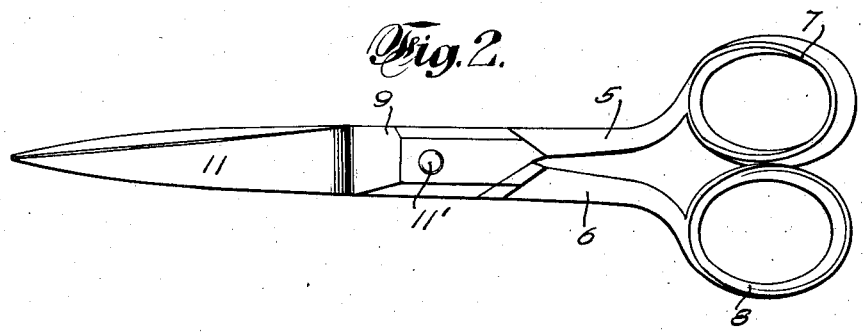
INVENTOR
STANLEY CLEMENTS
BY
ATTORNEYS.

Patented Nov. 15, 1938

2,136,414

UNITED STATES PATENT OFFICE 2,136,414

SHEARS

Stanley Clements, Houston, Tex., assignor of one-half to Alice R. Savage, Corpus Christi, Tex.

Application May 5, 1934, Serial No. 724,088

1 Claim. (Cl. 128—305)

My invention relates to shears, particularly though not exclusively, adapted for surgical use.

In performing surgical operations it is often necessary to sever tissue at the bottom of a cavity. With the shears now in use it is extremely difficult to clearly observe the line of shear, for the reason that the fingers or hand of the operator obstruct the vision, and the shear line, if visible at all to the operator, is not along the line of shear but at an angle thereto, for the reason stated, namely, that the fingers or hand of the operator normally mask the line of shear in ordinary surgical shears now in use.

It is the principal object of my invention, therefore, to provide shears in which the shear line may be at all times visible to the operator employing the shears, and this without the necessity of the operating assuming a strained, unnatural position of the hand.

Briefly stated, in a preferred form of the invention I provide shears of any desirable form or type, such as shears with handles having finger eyes therein and blades of suitable length and form for the accomplishment of the particular operation contemplated.

The shear line is offset transversely relatively to the handle portions to quite a substantial extent, so that the hand of the operator may assume a natural, unstrained position and the shear line will be clearly visible to the operator.

In the drawing which shows, for illustrative purposes only, a preferred form of the invention—

Fig. 1 is an edge view of shears illustrating features of the invention;

Fig. 2 is a side view of the shears shown in Fig. 1.

In said drawing 5—6 indicate handle portions having finger eyes 7—8 therein. 9—10 indicate generally blade portions and, as usual, a pivot 11' connects the two parts of the shears.

The shearing portion of the blades, in this case the forward portions 11—12, are offset transversely of the handle portions to a very considerable extent by rounded reverse bends, as indicated generally at 13—14. With the shear edges offset as stated, the line of shear indicated by the dot and dash line 15 will be beyond the ends of the fingers and hence clearly visible to the operator. Furthermore, with the shear edges offset the hand need not be held in a strained or unnatural position but the shears may be held naturally. Better vision will be possible than with the shears now in use, even though when using the latter the hand be strained and twisted in an attempt to observe the line of shear, which obviously can never be along the line of shear if the shear edges and handle portions are in the same plane.

By having the blade portions offset from the handle portions at a point forwardly of the pivot the entire line of shear is visible, and furthermore since the pivot is rearward or beyond the line of shear there is less likelihood of contamination at the pivot portion and hence there is greater assurance of perfect sterilization of the shears. When the blades and handles lie in offset substantially parallel planes as shown, the operator may look along the line of shear without tilting the handles or hand.

While the invention has been described particularly in connection with surgical shears, it is to be understood that the shears may be adapted to any other uses in the arts where shears may now be employed.

Only one preferred form of shears (and that term is intended to embrace scissors) has been disclosed, but I wish it understood that changes and modifications may be made within the scope of the invention as defined in the appended claim.

I claim:

Shears for surgical use particularly adapted for operating in the abdominal cavity, consisting of substantially flat handle and blade portions, the respective handle and blade portions being connected integrally by an offset which merges into the respective handle and blade portions in smooth, reverse, right angled bends, whereby the handle and blade portions are in parallel planes, a pivot for pivotally connecting the respective handle and blade portions at or near one of said bends, each of said blade portions being widest in the general region of said bends and generally tapering toward the tip end, said handle and blade portions having smooth and unobstructed exterior surfaces from the handle portions to the tips at their other ends, so as not to interfere with other portions of the body when the shears are in use, the effect of said substantial offsetting of said handles and blades being to give the surgeon an unobstructed view of the cutting edges of said blades when deep in the abdominal cavity, and the parallelism of said handles and blades enabling the surgeon to know the plane of said blades by an inspection of the plane of said handles.

STANLEY CLEMENTS.